S. MILLER.
DUMP WAGON.
APPLICATION FILED MAR. 2, 1914.

1,127,063.

Patented Feb. 2, 1915.

2 SHEETS—SHEET 1.

Witnesses:
Robert F. Weir
Arthur W. Carlson

Inventor
Samuel Miller
Foree Bain May
Attorney

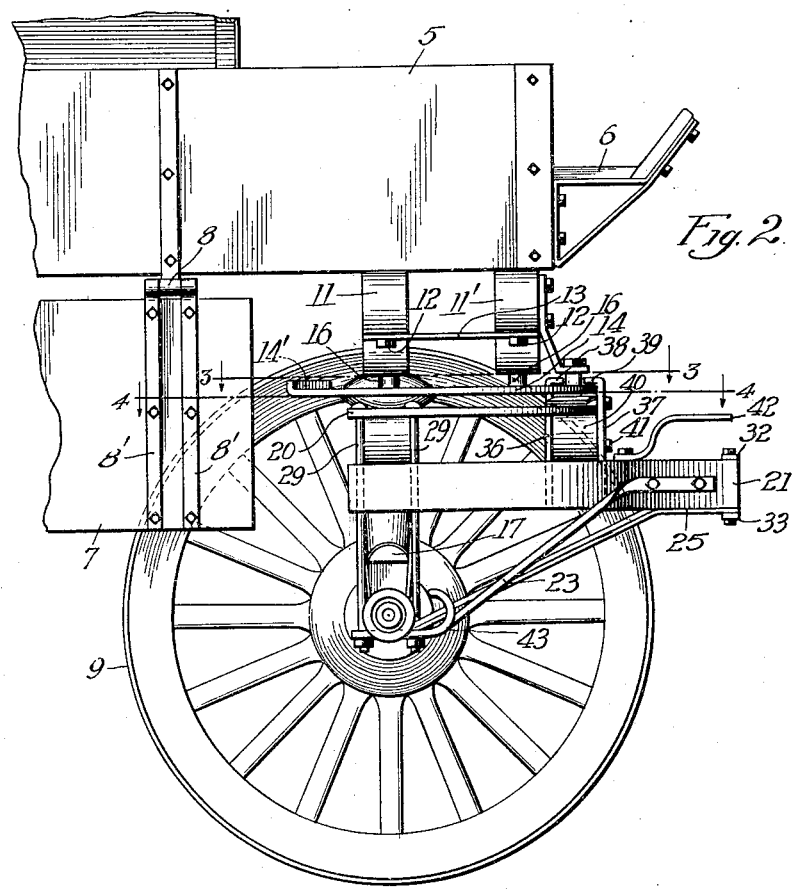

UNITED STATES PATENT OFFICE.

SAMUEL MILLER, OF CHICAGO, ILLINOIS.

DUMP-WAGON.

1,127,063. Specification of Letters Patent. Patented Feb. 2, 1915.

Application filed March 2, 1914. Serial No. 821,865.

*To all whom it may concern:*

Be it known that I, SAMUEL MILLER, a citizen of the United States, residing at Chicago, in the county of Cook and State of Illinois, have invented certain new and useful Improvements in Dump-Wagons, of which the following is a specification.

My invention relates to improvements in dump wagons.
One of the special objects of my invention is to provide a running gear construction, especially the front portion thereof, that is especially well adapted to use in connection with dump wagons, by the employment of which the dumping floor-doors may be brought as far forward, as may be, without being interfered with by the operation of the running gear when they have been lowered to dump the load.
Another object of my invention is to generally improve and strengthen the fore part of the running gear of such vehicles, without materially increasing its weight.

Figure 1:
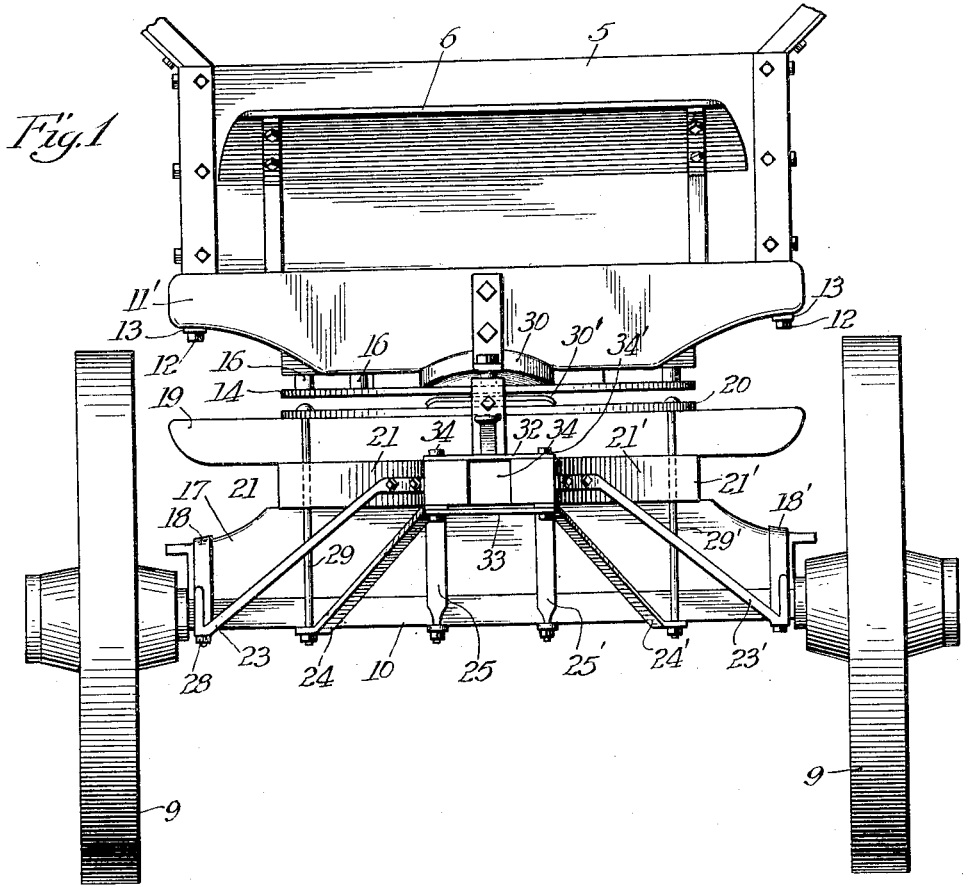
Figure 3:
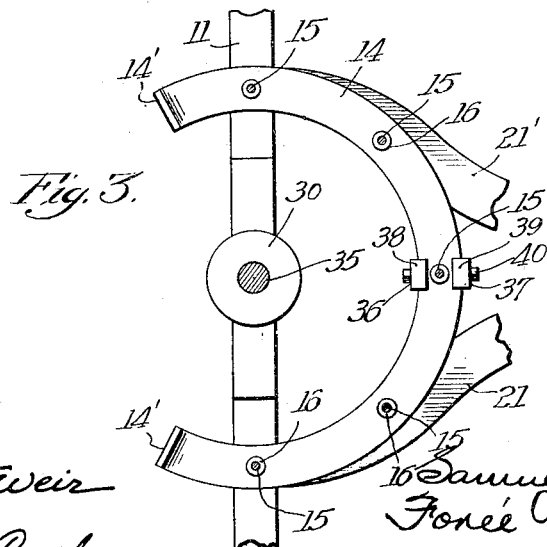

Other and further objects of my invention will become readily apparent to persons skilled in the art from a consideration of the following description, when taken in conjunction with the drawings, wherein:

Figure 1 is a front elevation of the dump wagon, showing my improved structure; Fig. 2 is a side elevation of the fore part of the wagon; Fig. 3 is a sectional view, taken on line 3—3 of Fig. 2; Fig. 4 is a sectional view, taken on line 4—4 of Fig. 2.
In all of the views the same reference characters are employed to indicate similar parts.

In the drawings, 5 indicates the front portion of the body of a dump wagon provided with a driver's seat and a foot board 6 located on the front end and having dumping doors, 7, hinged to the underside of the body, as at 8. These doors, of which there is one on each side of the transverse center of the wagon, when they are in normal, horizontal position, retain the load within the body, or bed, of the wagon. It will be observed that the forward end of the doors 7—7 approach very close to the fore part of the running gear of the vehicle, the running gear being made especially circumscribed to permit the dumping doors to extend as far forward as possible so that substantially the entire floor surface of the wagon may be comprised of the dumping doors that are hinged to either side thereof.

9—9 are the front wheels of the vehicle supported on the axle 10.

Dumping doors 7—7, which extend longitudinally of the wagon body, or bed part, are divided at the transverse center of said body and swing toward the wheels 9—9, respectively, so that if either of the front wheels 9—9 be cut under they are brought into contact with the corresponding dumping door 7. Such contact serves simply to lift the door 7 upon its hinged support 8, the tire of the wheel 9 being brought into contact with the hinge strip 8′ and these provide wearing surfaces to protect the door. Transversely positioned sills 11—11′ are secured to the front end of the bed 5 by bolts 12, which bolts pass through sill-connecting bars 13—13, one on each end, to thereby provide a frame for the upper fifth wheel member 14. Bolts 15 pass through the upper fifth wheel member 14 and through the sills 11—11′. These sills are spaced apart from the fifth wheel by means of collars 16.

A superposed wooden reinforcing axle section 17 is secured to the rectangular metal axle 10, at each of its ends, by saddle clips 18—18′ and by other means to be hereafter described. A bolster 19, immediately underlies the coöperating fifth wheel member, 20, and between the section 17 of the axle and the said bolster are the hounds 21—21′. Braces 23—23′, 24—24′, 25—25′ are secured to the metal axle section 10 and to the hounds 21 and 21′ respectively, to support the latter in substantially horizontal position. The ends of the saddle clips 18—18′ are screw-threaded and passed through the ends of the braces 23—23′, respectively, each of the clips and the part which it encompasses being held in position by means of nuts 28.

The braces 24—24′, and 25—25′ extend transversely of the axle 10 and rods 29—29′ pass through said braces, the respective hounds and through opposite ends of the bolster 19, and also through the lower fifth wheel member, 20, to secure the parts in proper relation.

Rocker plates, 30—30′, are secured to the upper sill structure 11—11′ and to the bolster 19 respectively. The king bolt 35 passes through said rocker plates and through the beam 11, and provides an axis around which the front axle and its two traction wheels 9—9 may be rotated. The front end of the hounds 21—21' are joined together by straps, 32 and 33, to provide a space 34 for the insertion of the tongue. The bolts 34—34' that hold the straps in place on the front of the hounds, also pass through the braces 24—24' respectively.

Vertically disposed guide clips 36 and 37 are connected to the hounds and have their confronting free ends inturned, as at 38 and 39, to overlie the fifth wheel members 14 and 20. These clips, or guides, are secured to a block 40, by bolts 41 and the inclined ends 38 and 39 provide a stop against the upturned portion 14' of the fifth wheel member 14, when the tongue is turned substantially at right angles to the longitudinal axis of the body, or bed, of the wagon. They also serve as means for supporting the hounds and tongue structure.

A clip 42 is employed for securing the tongue and whiffle tree in place between and on the hounds by means of a bolt, not shown.

Secured to the lower ends of the saddle clips 18—18' are hooks 43 for attachment of stay chains which are connected to the whiffle-tree of the wagon.

From the foregoing description and showing, it is apparent that most of the running gear associated with the front wheels is located in front of the axle 10 and that in the operation of the apparatus it will not interfere with the lowering or dumping of the doors 7—7 of the wagon. The simplicity of the structure is also apparent.

While I have herein shown a single embodiment of my invention for the purpose of clear disclosure, it is evident that changes may be made therein within the scope of the appended claim.

Having described my invention what I claim is:

In a dump wagon, the combination of a wagon body having two parallel, spaced-apart, cross sills at its forward end; of a forward running gear having its vertical axis in the plane of the rear sill; hounds terminating in a vertical plane substantially that of the rear sill; a substantially semi-circular fifth wheel member, carried by the hounds, extending substantially all in front of said rear sill; a coöperating fifth wheel member, of greater circumferential extent, having vertically deflected ends to provide stops, said member secured to both said sills and a clip secured to said hounds and partially encompassing said fifth wheel members to provide a stop, for engagement with the stop provided on the upper member of the fifth wheel.

In testimony whereof I hereunto set my hand in the presence of two subscribing witnesses.

SAMUEL MILLER.

In the presence of—
FORÉE BAIN.
MARY F. ALLEN.

Copies of this patent may be obtained for five cents each, by addressing the "Commissioner of Patents, Washington, D. C."